2,868,798

ZINC HALIDE COMPLEXES OF 2-MERCAPTO- AND 2,2'-DITHIOBIS-BENZOTHIAZOLE

Clifton L. Kehr, Wilmington, Del., assignor to E. I. du Pont de Nemours and Company, Wilmington, Del., a corporation of Delaware No Drawing. Application January 9, 1958
Serial No. 707,871

5 Claims. (Cl. 260—299)

This invention relates to zinc halide coordination complexes and more particularly to zinc halide complexes of 2-mercaptobenzothiazole and 2,2'-dithiobisbenzothiazole, and a method for their preparation.

In the sulfur curing of polyurethane polymers which are prepared from high molecular weight polyalkyleneether glycols, said polymers having side chains containing aliphatic C=C groups, the use of zinc halides as activating agents has been found to be highly effective. The use of zinc halides as activating agents, however, presents certain problems since these compounds are extremely hygroscopic and in contact with the skin are highly irritating. While proper precautions may be taken when they are used in a sulfur curing process to avoid undue contact with the skin, there is relatively no simple, convenient and economic way of preventing the zinc halides from rapidly absorbing moisture from the atmosphere. Accordingly, it would be highly desirable to provide an efficient and accurate way in which the zinc halides could be added and used as activating agents in the sulfur curing of polyurethane polymers having side chains containing aliphatic C=C groups.

It is an object of the present invention to provide new and useful zinc halide coordination complexes. It is a further object to provide zinc halide complexes of 2-mercaptobenzothiazole and 2,2'-dithiobisbenzothiazole. A still further object is to provide a process for the preparation of these zinc halide coordination complexes. Other objects will appear hereinafter.

These and other objects of the following invention are accomplished by the zinc halide coordination complexes selected from the group consisting of a 2-mercaptobenzothiazole:zinc halide complex and a 2,2'-dithiobisbenzothiazole:zinc halide complex, wherein the zinc halide is selected from the group consisting of zinc chloride, zinc bromide and zinc iodide. These coordination complexes have the formulae:

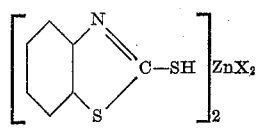

and

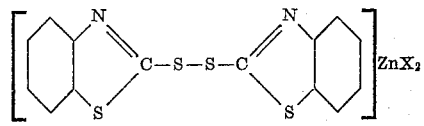

where X is chlorine, bromine or iodine. It is believed that the zinc halide is coordinated with the 2-mercaptobenzothiazole or 2,2'-dithiobisbenzothiazole on the nitrogen atom or atoms of these compounds. The 2-mercaptobenzothiazole complex with zinc halide is a 2:1 complex, i. e., there are 2 mols of 2-mercaptobenzothiazole for each mol of zinc halide, whereas the 2,2'-dithiobisbenzothiazole complex involves 1 mol of 2,2'-dithiobisbenzothiazole for each mol of zinc halide. For purposes of the present invention, the zinc chloride complex with either 2-mercaptobenzothiazole or 2,2'-dithiobisbenzothiazole are preferred.

The novel zinc halide complexes of the present invention are conveniently prepared by mixing the zinc halide with at least the stoichiometric quantity of the organic compound, i. e., the 2-mercaptobenzothiazole or 2,2'-dithiobisbenzothiazole in an inert medium under abrading conditions of agitation. By stoichiometric quantity is meant 1 mol of zinc halide to 2 mols of 2-mercaptobenzothiazole or 1 mol of zinc halide to 1 mole of 2,2'-dithiobisbenzothiazole. Suitable inert media are liquid substances such as toluene, xylene, benzene, trichloroethylene, tetrachloroethylene, chloroform, carbon tetrachloride, etc., in which the zinc halide is insoluble and which media themselves do not form complexes with the zinc halide. The agitation under abrading conditions of the zinc halide and the 2-mercaptobenzothiazole or 2,2'-dithiobisbenzothiazole in the presence of the inert medium, provides for intimate contact between the components taking part in the complex formation and disperses the complex which is formed. The abrading conditions are conveniently attained by the addition of abrading elements such as glass beads, porcelain balls or stainless steel balls to the inert medium. As these abrading elements are agitated, such as by mechanical stirring, the action of the moving elements on the crystals of the zinc halide component produces a more finely divided zinc halide and continually renews fresh surface for complex formation with the 2-mercaptobenzothiazole or 2,2'-dithiobisbenzothiazole. It is desirable that the reaction vessel in which the complex is formed have a glass, enamel or porcelain rather than a metal liner, in order to obviate the possibility of the zinc halide reacting with the metal surface. A stainless steel liner may be employed. In preparing these complexes, temperatures ranging from about 25–140° C. under the abrading conditions of agitation may be used in order to achieve rapid and substantially complete complex formation. The time involved in order to achieve substantially complete complex formation may range from about 4 to 48 hours. This time will, of course, be dependent upon the efficiency of the abrading elements which are used. The zinc halide complex which is formed may be conveniently isolated by filtering and air-drying the filter cake.

The zinc halide complexes of 2-mercaptobenzothiazole or 2,2'-dithiobisbenzothiazole of the present invention are high melting, free flowing, crystalline powders and are substantially non-hygroscopic. Accordingly, these complexes may be conveniently used as compounding ingredients in the sulfur curing of polyurethane polymers having side chains containing aliphatic C=C groups so as to provide the zinc halide as an activating agent and, in addition, they do not present as great a hazard as the free zinc halide when they come in contact with the skin.

The X-ray diffraction patterns of the crystals of the coordination complexes show the absence of both free 2-mercaptobenzothiazole or 2,2'-dithiobisbenzothiazole and free zinc halide. The complex can be broken by treating with a solvent in which the zinc halide is soluble, such as water, alcohol, aqueous acetone, etc., and following this treatment, the 2-mercaptobenzothiazole or 2,2'-dithiobisbenzothiazole is recovered unchanged. It is quite obvious, therefore, that these solvents would not be satisfactory for preparing these complexes.

As mentioned above, the novel zinc halide complexes of the present invention are useful as compounding ingredients in the sulfur curing of polyurethane polymers having side chains containing aliphatic C=C groups. These polyurethane polymers may be conveniently prepared from a high molecular weight polyalkyleneether glycol, such as a polytetramethyleneether glycol, an organic diisocyanate, and a low molecular weight, non-polymeric glycol, such as 3-allyloxy-1,2-propanediol. These polymers are more particularly described in U. S. Patent 2,808,391. The use of these zinc halide complexes in a sulfur curing procedure will be more particularly illustrated in the following examples.

The following examples will better illustrate the nature of the present invention; however, the invention is not intended to be limited to these examples. Parts are by weight unless otherwise indicated. In these examples the following symbols are used:

MBTS—refers to 2,2'-dithiobisbenzothiazole, also known as benzothiazyl disulfide.
MBT—refers to 2-mercaptobenzothiazole.
$d(A.)$—refers to interplanar spacing.
$I/I_1$—refers to the relative intensity of the peaks with the first listed peak in each case being the most intense and having an assigned value of 100.

EXAMPLE 1

A. Preparation of MBTS:zinc halide complex 25.0 grams of MBTS and 16.9 g. of zinc bromide are suspended in 500 ml. of toluene. Small glass beads are added to the toluene to aid in pulverizing and renewing the surface of the insoluble zinc bromide while the mixture is agitated with a mechanical stirrer. The mixture is heated to reflux with continuous agitation for four hours and then filtered hot. The filtered, yellow solid is washed with hot benzene and dried in a stream of air. 41.1 grams of complex is obtained and this complex melts at 295° C. with decomposition.

In a similar manner, the zinc chloride and zinc iodide complexes with MBTS may be prepared.

B. Analysis of MBTS:zinc halide complexes

|  | MBTS: $ZnCl_2$ | | MBTS: $ZnBr_2$ | | MBTS: $ZnI_2$ | |
| --- | --- | --- | --- | --- | --- | --- |
|  | Theory | Found | Theory | Found | Theory | Found |
| Percent C | 35.9 | 35.5 | 30.14 | 30.15 | 25.8 | 24.8 |
| Percent H | 1.72 | 1.8 | 1.45 | 1.6 | 1.24 | 1.35 |
| Percent N | 6.0 | 6.1 | 5.0 | 4.95 | 4.3 | 3.95 |
| Percent S | 27.4 | 26.55 | 23.0 | 22.25 | 19.7 | 18.2 |
| Percent Zn | 14.0 | 14.5 | 11.72 | 11.45 | 10.0 | 10.5 |
| Percent Cl, Br or I | 15.1 | 15.85 | 28.7 | 29.55 | 39.0 | 39.55 |
| Melting Range, °C | 275–280 | | 295 | | 295–300 | |
| X-ray diffraction: | | | | | | |
| $d$ (A.) | 6.63, 3.43, 3.67 | | 6.65, 3.45, 3.77 | | 4.18, 8.3, 3.73 | |
| $I/I_1$ | 100, 90, 60 | | 100, 90, 65 | | 100, 90, 75 | |

C. Recovery of MBTS from MBTS:zinc halide complexes 5.0 grams of an MBTS:zinc bromide complex is suspended in 100 ml. of absolute methanol and stirred at room temperature for one hour. The color of this suspension changed from yellow to grayish white and the solution was then filtered and the solid product washed with methanol. The solid product is crude MBTS and after air drying weighs 3.0 g. (100 of theory). It is then recrystallized from 150 ml. of benzene to give 2.2 g. of MBTS which has a melting point of 180–181° C. The recrystallized MBTS gives the following analysis:

|  | Theory | Found |
| --- | --- | --- |
| Percent S | 38.6 | 38.05 |
| Percent N | 8.43 | 8.25 |
| Percent C | 50.54 | 50.45 |
| Percent H | 2.42 | 2.45 |

The sample of recrystallized MBTS is dissolved in chloroform and the ultraviolet spectrum is obtained. It shows the absorption peak at 2750 A. which is characteristic of MBTS.

EXAMPLE 2

A. Preparation of MBT:zinc halide complexes 10.0 grams of MBT and 6.75 g. of zinc bromide are suspended in 200 ml. of toluene. Small glass beads are added and the mixture is mechanically agitated at the reflux temperature for four hours. The mixture is then filtered and the solid product is washed with benzene and air dried. 14.5 g. of product is obtained and this product melts at about 240–245° C.

In a similar manner the zinc chloride and zinc iodide complexes with MBT may be prepared.

B. Analysis of MBT:zinc halide complexes

|  | MBT: $ZnCl_2$ | | MBT: $ZnBr_2$ | | MBT: $ZnI_2$ | |
| --- | --- | --- | --- | --- | --- | --- |
|  | Theory | Found | Theory | Found | Theory | Found |
| Percent C | 35.7 | 35.45 | 30.2 | 30.45 | 25.7 | 25.5 |
| Percent H | 2.15 | 2.25 | 1.80 | 1.90 | 1.54 | 1.7 |
| Percent S | 27.3 | 26.75 | 22.9 | 22.35 | 19.6 | 18.95 |
| Percent N | 6.0 | 5.75 | 5.0 | 4.6 | 4.3 | 5.6 |
| Percent Zn | 13.9 | 14.05 | 11.7 | 11.5 | 10.0 | 9.85 |
| Percent Cl, Br, or I | 15.1 | 15.35 | 28.6 | 26.9 | 38.8 | 37.6 |
| Melting Range °C | 230 | | 240–245 | | 260–262 | |
| X-ray diffraction: | | | | | | |
| $d(A.)$ | 5.53, 7.7, 5.40, 3.60 | | | | | |
| $I/I_1$ | 100, 80, 60, 60 | | | | | |

C. Recovery of MBT from MBT:zinc halide complexes 1.0 grams of an MBT:zinc chloride complex is dissolved in acetone. The solution is then diluted with a large volume of water and the solid material which separates is filtered off, washed with water, then with petroleum ether and then air dried. The product has a melting point of 180° C., alone or mixed with an authentic sample of 2-mercaptobenzothiazole.

EXAMPLE 3

Preparation of MBTS:zinc chloride complex 2221 grams of MBTS and 906 g. of zinc chloride are suspended in 9000 ml. of tetrachloroethylene contained in a 5-gallon cylindrical porcelain ball mill. Porcelain balls (¾ to 1 inch in diameter) are added to aid in pulverizing and renewing the surface of the insoluble zinc chloride. The porcelain vessel is closed and subsequently rotated at room temperature for 24 hours. It is then opened and the contents are filtered. The solid thus separated is dried in an air stream. 3070 grams of complex is obtained.

EXAMPLE 4

Preparation of MBT:zinc chloride complex 33.2 grams of MBT and 13.6 g. of zinc chloride are suspended in 200 ml. of carbon tetrachloride contained in a glass reaction vessel. Small glass beads are added and the mixture is mechanically agitated for 24 hours at room temperature. The mixture is then filtered and the solid product thus collected is air dried. 47.3 grams of the complex is obtained.

EXAMPLE 5

Preparation of MBTS:zinc chloride complex 33.2 grams of MBTS and 13.6 g. of zinc chloride are suspended in 200 ml. of carbon tetrachloride contained in a glass reaction vessel. Small glass beads are added and the mixture is mechanically agitated for 24 hours at room temperature. The mixture is then filtered and the solid product thus collected is air dried. 46.5 grams of the complex is obtained.

EXAMPLE 6

A. Preparation of polyurethane polymers 3 mols of toluene-2,4-diisocyanate is added to 1 mol of 3-(allyloxy)-1,2-propanediol and the mixture is agitated for 3 hours at 80° C. under an atmosphere of nitrogen. To this mixture is added 2 mols of polytetramethylene-ether glycol of molecular weight 1000 and the mass is agitated at 80° C. for 1 hour. It is then transferred to a polyethylene-lined container and heated in an oven at 80° C. for 72 hours. A rubbery polymer is obtained which has an average of one side chain allyloxy group for each 2650 units of molecular weight.

B. Sulfur curing of polyurethane polymer 100 parts of the polymer from A above is compounded on a rubber roll mill with 30 parts of high abrasion furnace black, 2 parts of sulfur, 4 parts of 2,2'-dithiobis-benzothiazole, 1 part of 2-mercaptobenzothiazole, and 0.35 part of an MBTS:zinc chloride complex. The compounded stock is cured in molds in a press at 150° C. for 80 minutes. The cured elastomer shows the following properties at 25° C.:

| | |
|---|---:|
| Tensile strength at the break, lbs./sq. in. | 5100 |
| Modulus at 300% elongation, lbs./sq. in. | 4295 |
| Elongation at the break, percent | 335 |
| Yerzley resilience | 73 |
| Compression set | 34 |

When the zinc bromide or zinc iodide MBTS complexes are used instead of the zinc chloride complex, a cured elastomer having similar properties is obtained.

EXAMPLE 7

100 parts of the polymer of Example 3–A is compounded with 30 parts of high abrasion furnace black, 1.5 parts of sulfur, 3 parts of 2,2'-dithiobisbenzothiazole, 0.75 part of 2-mercaptobenzothiazole and 0.35 part of an MBT:zinc chloride complex. The compounded stock is cured in molds in a press at 150° C. for 40 minutes. The cured elastomer has the following properties at 25° C.:

| | |
|---|---:|
| Tensile strength at the break, lbs./sq. in. | 5100 |
| Modulus at 300% elongation, lbs./sq. in. | 3160 |
| Elongation at the break, percent | 400 |
| Yerzley resilience | 69 |
| Compression set | 39 |

When the zinc bromide or zinc iodide MBT complexes are used instead of the zinc chloride complex, a cured elastomer having similar properties is obtained.

This application is a continuation-in-part of U. S. application Serial No. 599,935, filed July 25, 1956, now abandoned.

As many widely different embodiments of this invention may be made without departing from the spirit and scope thereof, it is to be understood that this invention is not limited to the specific embodiments thereof except as defined in the appended claims.

What is claimed is:

1. A process for the preparation of a zinc halide coordination complex selected from the group consisting of a 2-mercaptobenzothiazole:zinc halide complex and a 2,2'-dithiobisbenzothiazole:zinc halide complex which comprises mixing a zinc halide selected from the group consisting of zinc chloride, zinc bromide and zinc iodide with at least a stoichiometric quantity of an organic compound selected from the group consisting of 2-mercaptobenzothiazole and 2,2'-dithiobisbenzothiazole, under abrading conditions of agitation in an inert organic liquid medium, at a temperature of from about 25 to 140° C. and recovering the resulting complex.

2. A process according to claim 1 wherein the zinc halide is zinc chloride and the organic compound is 2-mercaptobenzothiazole.

3. A process according to claim 1 wherein the zinc halide is zinc chloride and the organic compound is 2,2'-dithiobisbenzothiazole.

4. A process according to claim 1 wherein the inert medium is tetrachloroethylene.

5. A process according to claim 1 wherein the inert medium is trichloroethylene.

References Cited in the file of this patent

UNITED STATES PATENTS

| | | |
|---|---|---|
| 2,801,246 | Petersen et al. | July 30, 1957 |